(12) United States Patent
Naoi et al.

(10) Patent No.: US 6,367,159 B1
(45) Date of Patent: Apr. 9, 2002

(54) METHOD AND APPARATUS FOR MEASURING SURFACE SHAPE OF THIN ELEMENT

(75) Inventors: Kaoru Naoi; Kenichi Shindo; Shinju Ito, all of Kawasaki (JP)

(73) Assignee: Kuroda Precision Industries, Ltd., Kanagawa-ken (JP)

(*) Notice: Subject to any disclaimer, the term of this patent is extended or adjusted under 35 U.S.C. 154(b) by 0 days.

(21) Appl. No.: 09/281,027

(22) Filed: Mar. 30, 1999

(30) Foreign Application Priority Data

Jun. 8, 1998 (JP) .......................................... 10-158892

(51) Int. Cl.$^7$ .............................. G01B 5/20; G01B 3/22
(52) U.S. Cl. ............................. 33/552; 33/551; 33/554; 33/555; 33/501.02
(58) Field of Search ............................. 33/1 M, 1 PT, 33/533, 551, 552, 553, 573, 832, 833, 549, 554, 555, DIG. 2, DIG. 21, 792, 793, 794, 501.02, 834; 414/936, 805, 806; 73/1.79; 356/630

(56) References Cited

U.S. PATENT DOCUMENTS

| | | | | |
|---|---|---|---|---|
| 2,508,251 A | * | 5/1950 | Ingle | 33/174 |
| 2,616,068 A | * | 6/1952 | McDonald | 318/452 |
| 4,597,182 A | * | 7/1986 | Rinn | 33/1 M |
| 4,849,916 A | * | 7/1989 | Abbe et al. | 702/170 |
| 4,860,229 A | | 8/1989 | Abbe et al. | |
| 4,862,596 A | * | 9/1989 | Iino et al. | 33/522 |
| 4,931,962 A | * | 6/1990 | Palleiko | 702/94 |
| 4,941,269 A | * | 7/1990 | Mori et al. | 33/783 |
| 5,022,267 A | * | 6/1991 | Shattuck et al. | 73/593 |
| 5,042,162 A | * | 8/1991 | Helms | 33/503 |
| 5,097,602 A | * | 3/1992 | Cross et al. | 33/551 |
| 5,465,496 A | * | 11/1995 | Axon | 33/522 |
| 5,575,075 A | * | 11/1996 | Sasaki | 33/501.02 |
| 5,625,958 A | * | 5/1997 | DeCoursey et al. | 33/555 |
| 5,642,298 A | | 6/1997 | Mallory et al. | |
| 6,025,689 A | * | 2/2000 | Prentice et al. | 318/625 |
| 6,038,028 A | * | 3/2000 | Grann et al. | 356/381 |
| 6,041,512 A | * | 3/2000 | Wacke | 33/522 |

FOREIGN PATENT DOCUMENTS

| | | |
|---|---|---|
| JP | 5-77179 | 3/1993 |
| JP | 5-141426 | 6/1993 |
| JP | 10-47949 | 2/1998 |

* cited by examiner

*Primary Examiner*—Andrew H. Hirshfeld
*Assistant Examiner*—Yaritza Guadalupe
(74) *Attorney, Agent, or Firm*—Blackwell Sanders Peper Martin LLP

(57) ABSTRACT

Method for measuring the surface shape of a thin element such as a silicon wafer measures the surface shapes of one surface and the other surface of the thin element by independently measuring the distance each to one surface and to the other surface of the thin element by rotating or moving the thin element within a single plane and independently moving the first and second measuring means along the first and second guide shafts. Apparatus for measuring the surface shape of the thin element measures the surface shapes of one surface and the other surface of the thin element by rotating or moving the thin element supported within the same plane by a supporting means, and independently measuring the distance each to one surface and to the other surface of the thin element by the first and second measuring means while independently moving the first and second sliders along the first and second guide shafts. The method measures the thickness of each part of the thin element based on the surface shapes of one surface and the other surface of the thin element as measured by the method for measuring the surface shape of the thin element and the distance between the first and second measuring means.

10 Claims, 12 Drawing Sheets

Prior Art

METHOD AND APPARATUS FOR MEASURING SURFACE SHAPE OF THIN ELEMENT

BACKGROUND OF THE INVENTION

1. Field of the Invention

The present invention relates to a method and apparatus for measuring the surface shape of a thin element, i.e., a flat, board-like element, such as a silicon wafer by which the surface shape of the thin element measured with accuracy, and a method for measuring the thickness of such thin element. Thus, as used herein the term "thin element" means such a thin flat, board-like member or element, for a specific purpose, without connoting or requiring that it be rectangular.

2. Related Art

Conventionally known apparatuses for measuring the surface shape of a thin element such as a silicon wafer are disclosed in, for example, Japanese Patent Publication No. Hei 5-77179, Japanese Patent Laid-Open Publication No. Hei 10-47949 and others.

FIG. 15 shows the apparatus disclosed in Japanese Patent Publication No. Hei 5-77179. This apparatus has a thin element 2 such as a silicon wafer adsorbed and supported by a rotatable vacuum chuck 1. A displacement meter 3 is disposed on either side of thin element 2 and supported by arm 4 and supporting member 5.

To evaluate the shape of thin element 2 by the apparatus, deviation in a group of thickness data obtained by measuring in a necessary region is determined to be the flatness of the thin element 2 because the thin element 2 is assumed to be used in a state tightly adhered to a reference plane such as a flat surface.

Such conventional evaluation method had a disadvantage that the surface of thin element 2 tightly adhered to the reference plane had local irregularities, or even if its thickness was uniform, waviness with a small cycle. When the surface was not fully adhered to the reference plane, such irregularity or waviness also was indicated as a shape formed on the opposed surface, and an overestimate or an underestimate might be made in evaluating the shape of the silicon wafer or the like to which a fine pattern was drawn or transferred.

For example, FIG. 16(a) shows that when local recess 2b having a length of a few millimeters to a few tens of millimeters is formed on back surface 2a of thin element 2 made of silicon wafer, thin element 2 cannot be tightly adhered with certainty to reference plane K by a suction force of a vacuum adsorption disk when a pattern is transferred; the evaluated result of flatness based on data of thickness shows that recess 2b is present on front surface 2c of thin element 2 as shown in FIG. 16 (a'), and it is judged that thin element 2 is defective even if it has a shape good enough to transfer the pattern.

Also, for example, when local projection 2d having a length of a few millimeters to a few tens of millimeters is formed on back surface 2a of thin element 2 as shown in FIG. 16(b), the periphery of the projection 2d cannot be tightly adhered to reference plane K; the evaluated result of flatness based on data of thickness shows that projection 2d smaller than the actual one is present on front surface 2c of thin element 2 as shown in FIG. 16(b'), and the pattern is defectively transferred in a region broader than the one actually evaluated.

Moreover, when thin element 2 has a uniform thickness and waviness with a short cycle as shown in FIG. 16(c), back surface 2a of projection 2e cannot be tightly adhered with certainty to reference plane K; the evaluated result of flatness based on data of thickness shows that thin element 2 has a flat state as shown in FIG. 16(c'), resulting in the causation of a defective transferring of a pattern which cannot be presumed from the evaluation.

Since the conventional apparatus aims to measure the thickness of thin element 2, a constant relative distance between pair of displacement meters 3 for measuring both surfaces of thin element 2 has to be maintained. As shown in FIG. 17, forked holding part 6 is disposed to have thin element 2 therebetween; displacement meters 3 are mounted at the leading ends of holding part 6; and root part 7 of holding part 6 is supported to move holding part 6. Therefore, the conventional apparatus had the following disadvantages.

Specifically, when thin element 2 has a diameter as large as 300 mm, forked holding part 6 is required to have the length of at least 150 mm to measure the entire surface of thin element 2, and its root part 7 is also 150 mm or more millimeters away from displacement meters 3. Therefore, the moving accuracy of root part 7 is enlarged, an error is caused due to straightness of displacement meters 3, and an Abbe error is caused because the measurement points of pair of displacement meters 3 are deviated.

Also, when forked holding part 6 vibrates like a tuning fork, the relative distance between the pair of displacement meters 3 is varied, resulting in causation of an error.

SUMMARY OF THE INVENTION

The present invention was achieved in order to remedy the existing problems described above. It is an object of the invention to provide a method and apparatus for measuring the surface shape of a thin element with high accuracy the surface shape of a thin element such as a silicon wafer, glass for liquid crystals or a masking member.

Another object of the invention is to provide an apparatus with a simple structure for measuring surface shapes of thin elements, and which particularly can measure the surface shape of a thin element with high accuracy.

Another object of the invention is to provide a method for measuring the thickness of a thin element, with high accuracy as required.

A method for measuring the surface shape of a thin element according to the present invention comprises supporting the thin element so to be rotatable within a single plane, disposing first and second guide shafts respectively on one side and the other side of the plane so as to be parallel to the plane and to each other, measuring the distance each to one surface and to the other surface of the thin element by the first and second measuring means which independently moves along the first and second guide shafts, and measuring the surface shapes of one surface and the other surface of the thin element.

Another method for measuring the surface shape of a thin element according to the present invention comprises supporting the thin element so as to be movable within a single plane, disposing first and second guide shafts respectively on one side and the other side of the plane so as to be parallel to the plane and to each other, measuring the distance each to one surface and to the other surface of the thin element by the first and second measuring means which independently moves along the first and second guide shafts, and measuring the surface shapes of one surface and the other surface of the thin element.

An apparatus for measuring the surface shape of a thin element according to the present invention comprises a supporting means for supporting the thin element so to be rotatable within a single plane, first and second guide shafts which are disposed respectively on one side and the other side of the said plane so to be parallel to the plane and to each other, first and second sliders which move independently along the first and second guide shafts, and first and second measuring means which are fixed to the first and second sliders and which independently measure the distance each to one surface and to the other surface of the thin element.

Another apparatus for measuring the surface shape of a thin element according to the present invention comprises a supporting means for supporting the thin element so to be movable within a single plane, first and second guide shafts which are disposed respectively on one side and the other side of the said plane so as to be parallel to the plane and each other, first and second sliders which move independently along the first and second guide shafts, and first and second measuring means which are fixed to the first and second sliders and which independently measure each distance to one surface and the other surface of the thin element.

The apparatus for measuring the surface shape of a thin element according to the present invention further comprises aligning means for positioning the first and second measuring means on the same axial line which is perpendicular to the plane.

A method for measuring the thickness of a thin element according to the present invention measures the thickness of each part of the thin element based on the surface shapes of one surface and the other surface of the thin element as measured by any of said methods for measuring the surface shape of a thin element according to the invention and the distance between the first and second measuring means.

DETAILED DESCRIPTION OF PREFERRED EMBODIMENTS

Embodiments according to the invention will be described in detail with reference to the accompanying drawings.

Figure 1:
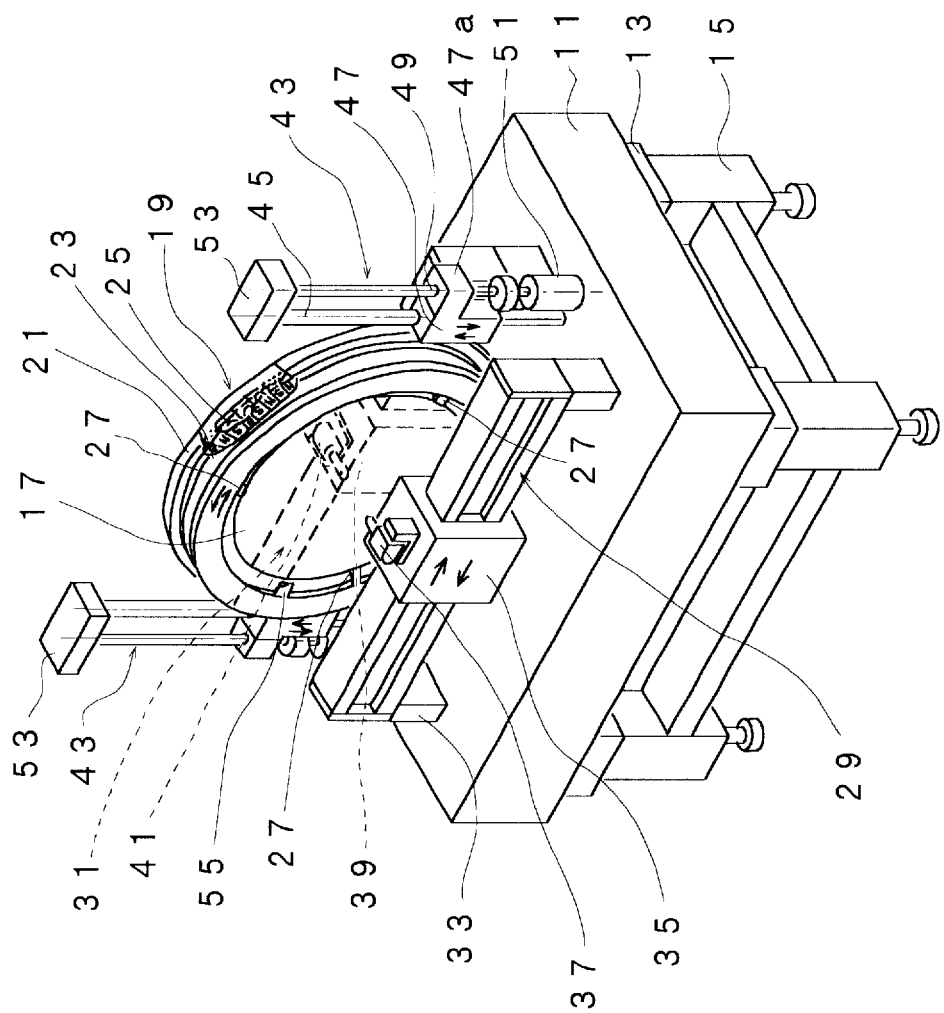
FIG. 1 is a perspective diagram showing one embodiment of an apparatus for measuring the surface shape of a thin element according to the present invention.

FIG. 1 shows an embodiment of an apparatus for measuring the surface shape of a thin element according to the invention.

In the drawing, reference numeral 11 denotes a rectangular base member placed with its top surface horizontal. The base member 11 is made of granite, and is supported by legs 15 via air spring 13 so that it is prevented from being influenced by disturbances or vibrations.

Circular thin element 17 made of silicon wafer is disposed above the top surface of base member 11.

Thin element 17 is rotatably supported in a vertical plane by supporting member 19 that has a circular fixing member 21 and a rotating member 23.

Fixing member 21 has a coil built in for a brushless DC motor (not shown), and rotating member 23 has magnets 25 built in for the brushless DC motor, thereby configuring the brushless DC motor.

A plurality of supporting members 27 for supporting thin element 17 are disposed at predetermined angles within rotating member 23.

First guide shaft 29 and second guide shaft 31 are horizontally disposed on either side of the vertical plane including thin element 17, and shafts 29 and 31 are disposed to be parallel to the vertical plane and parallel to each other.

First guide shaft 29 and second guide shaft 31 are fixed to the top surface of base member 11 via brackets 33. Shafts 29 and 31 are very highly straight as will be described later.

A first slider 35 is mounted on first guide shaft 29 so to move along first guide shaft 29. A first measuring means 37 for measuring a distance to one surface of thin element 17 is mounted on first slider 35.

A second slider 39 is mounted on second guide shaft 31 so to move along second guide shaft 31. A second measuring means 41 for measuring the distance to another surface of thin element 17 is mounted on second slider 39.

In this embodiment, a non-contact laser displacement meter is used for first measuring means 37 and second measuring means 41.

An air slide having a linear motor therein as will be described below is used for first slider 35 and second slider 39.

This embodiment has the same parts for first and second guide shafts 29, 31, first and second sliders 35, 39 and first and second measuring means 37, 41, respectively.

Vertically moving means 43 for vertically moving thin element 17 is disposed on either side of thin element 17 in its radial direction.

Vertically moving means 43 has a third guide shaft 45 which is vertically fixed to the top surface of base member 11. A third slider 47 is movably mounted on third guide shaft 45, and fixing member 21 of supporting means 19 for supporting thin element 17 is connected to third slider 47. A bracket 47a is formed on third slider 47 and threaded with a ball screw 49. Ball screw 49 is vertically disposed on the top surface of base member 11 and rotated by motor 51 which is fixed to the top surface of base member 11.

In this embodiment, top ends of third guide shaft 45 and ball screw 49 are supported by a reinforcing member 53. This embodiment also has a block member 55 as an aligning means for positioning first measuring means 37 and second measuring means 41 on the same axial line perpendicular to the vertical plane including thin element 17. Block member 55 is fixed to the inner circumference of rotating member 23.

Figure 2:
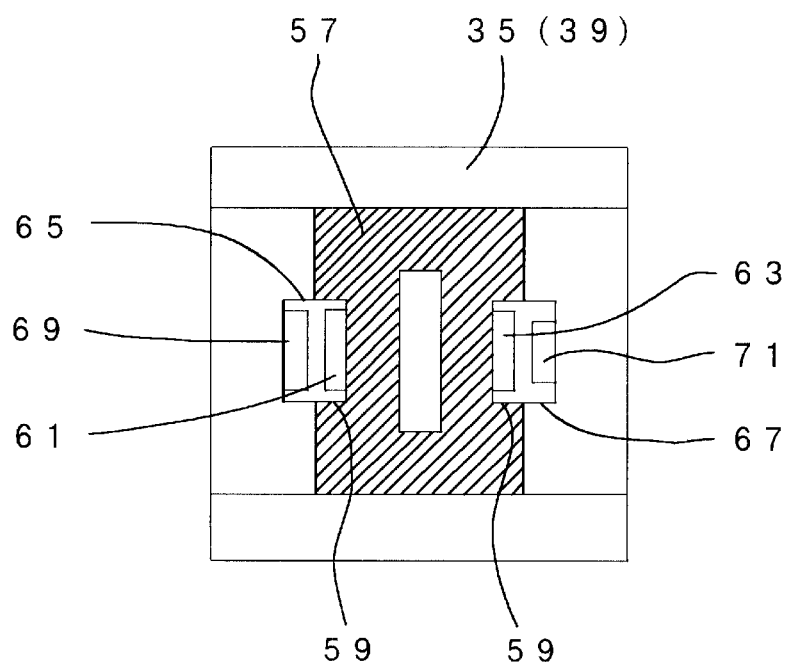
FIG. 2 is a sectional diagram showing a guide shaft of FIG. 1 in detail.

FIG. 2 shows said first guide shaft 29 and second guide shaft 31 in detail.

Guide shafts 29, 31 respectively each have a linear motor coil 61 and linear scale 63 accommodated in respective recesses 59 formed at the center of a side wall of a guide shaft 57 which side wall is not required for the guide function as a static pressure air bearing.

A linear motor magnet 69 and a scale reading sensor 71 are accommodated in recesses 65 and 67 formed in sliders 35, 39 so as to oppose the respective recesses 59, and a drive system and the static pressure air bearing are integrally formed on single guide shaft 57.

Guide shafts 29, 31 are disclosed in, for example, Japanese Patent Laid-Open Publication No. Hei 5-141426.

Figure 3:
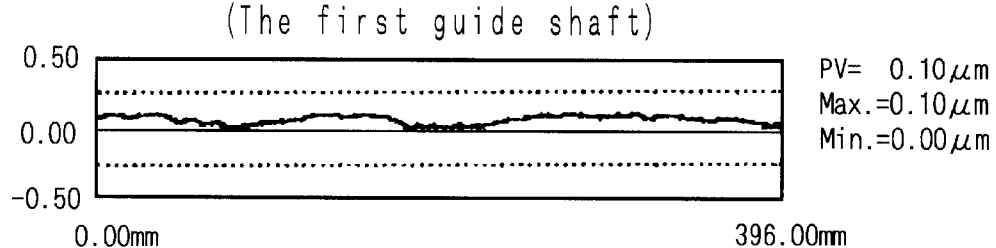
FIG. 3 is an explanatory diagram showing the straightness of the first guide shaft and the second guide shaft shown in FIG. 1.
Figure 3:
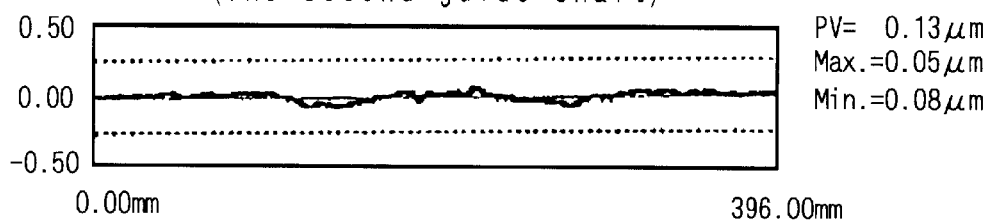

FIG. 3 shows the results of measuring the straightness of first guide shaft 29 and second guide shaft 31 described above.

Such measurement was made by measuring a straight master having the straightness of $\frac{1}{10}$, and the straightness accuracy of 0.10 $\mu$m and 0.13 $\mu$m was confirmed.

The same measurement was repeated ten times, and the deviation (standard deviation) of straightness was confirmed to be 0.03 $\mu$m or below.

Accordingly, by entering correction data of straightness of first guide shaft 29 and second guide shaft 31 into a personal computer, a measurement accuracy of 0.2 $\mu$m can be achieved.

The apparatus for measuring the surface shape of a thin element configured as described above measures the surface shape of thin element 17 as follows.

Figure 4:
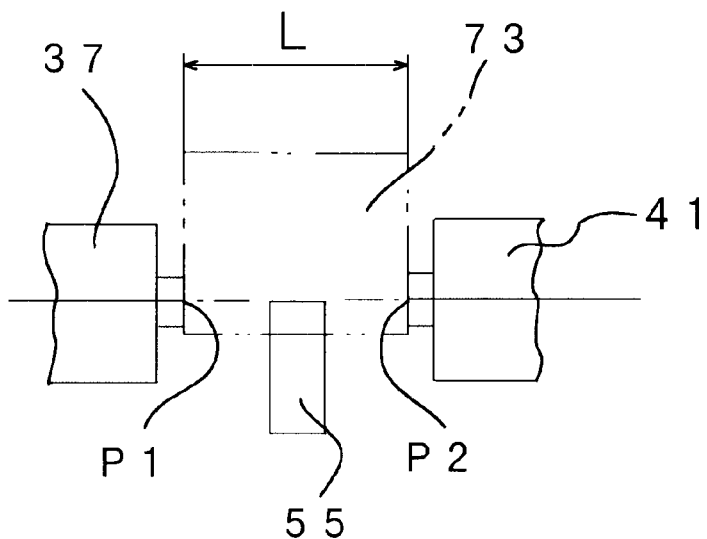
FIG. 4 is an explanatory diagram showing a method for using a block member shown in FIG. 1.

As shown in FIG. 4, distance L between standard point P1 of first measuring means 37 and standard point P2 of second measuring means 41 is accurately measured by, for example, block gage 73 indicated by a two point chain line.

First measuring means 37 and second measuring means 41 are then positioned on the same axial line perpendicular to the vertical plane including thin element 17 by block member 55 used as the aligning means.

Such positions are determined as the original positions of measurement of first measuring means 37 and second measuring means 41.

Figure 5:
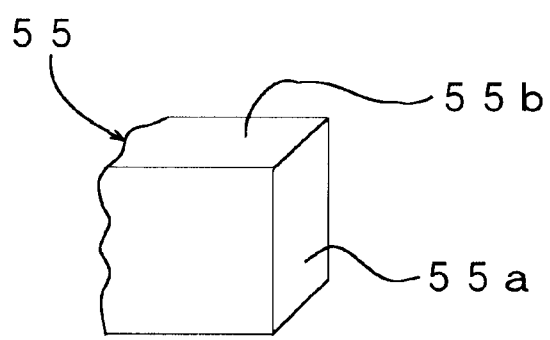
FIG. 5 is a perspective diagram showing the block member shown in FIG. 4.

In this embodiment, block member 55 has a horizontal reference plane 55a and a vertical reference plane 55b, as shown in FIG. 5, which are formed squarely, i.e., perpendicularly with high accuracy.

First slider 35 and second slider 39 are independently moved along first guide shaft 29 and second guide shaft 31 while thin element 17 of a silicon wafer supported by support members 27 of support means 19 is rotated within the vertical plane, and the distance each to one surface and to the other surface of thin element 17 is independently measured by first measuring means 37 and second measuring means 41 to determine the shapes of one surface and the other surface of thin element 17.

Thin element 17 as supported by support means 19 is vertically moved within the vertical plane by driving motor 51 of vertical moving means 43 to measure the surface shape of either surface of thin element 17.

Figure 6:
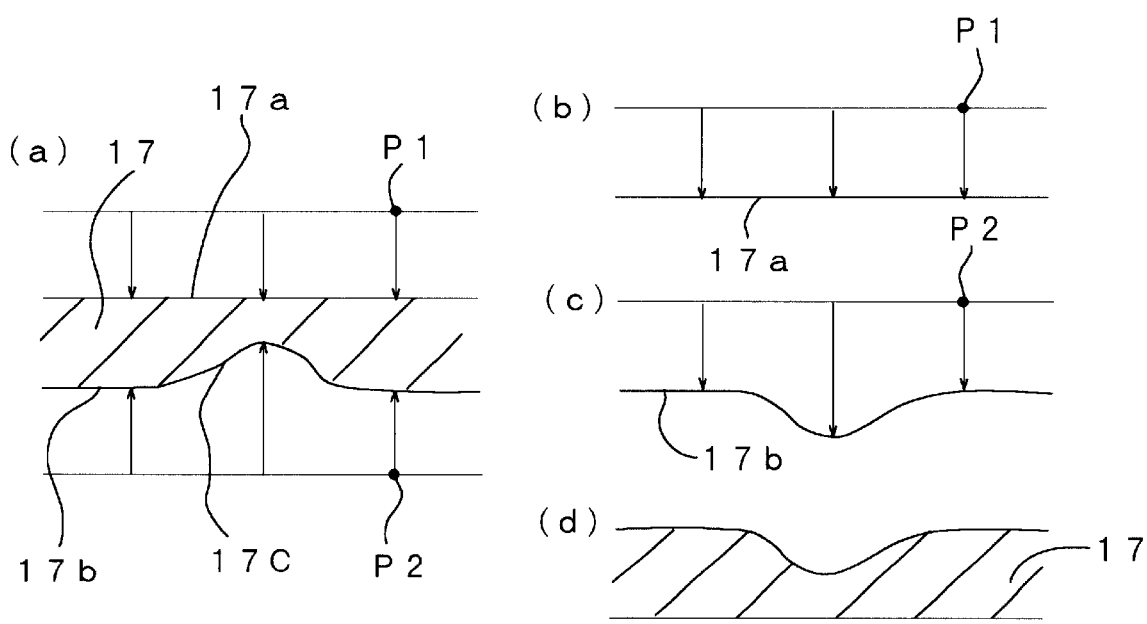
FIG. 6 is an explanatory diagram showing an example of the measuring of a thin element by the apparatus for measuring the surface shape of a thin element shown in FIG. 1.
Figure 7:
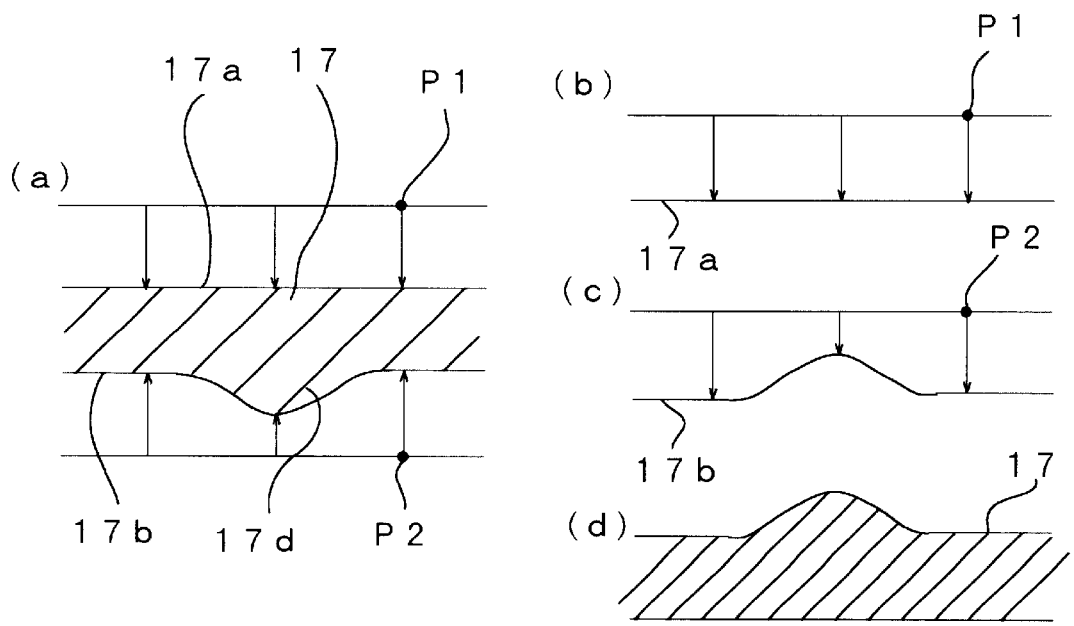
FIG. 7 is an explanatory diagram showing an example of the measuring of a thin element by the apparatus for measuring the surface shape of a thin element shown in FIG. 1.
Figure 8:
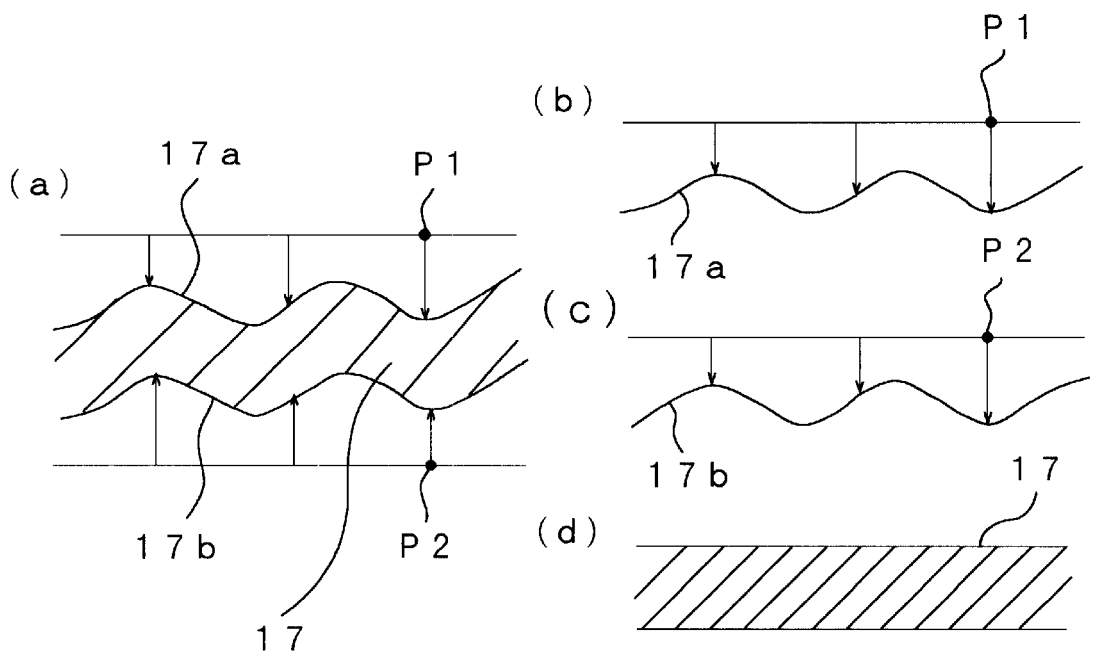
FIG. 8 is another explanatory diagram showing an example of the measuring of a thin element by the apparatus for measuring the surface shape of a thin element shown in FIG. 1.

FIG. 6 through FIG. 8 show the surface shapes of one surface 17a and the other surface 17b of thin element 17 measured as described above.

FIG. 6(*a*) shows that local recess 17c having the length of a few millimeters to a few tens of millimeters is formed on the other surface 17b of thin element 17, i.e., a silicon wafer.

Distance from standard point P1 of first measuring means 37 to one surface 17a of thin element 17 is continuously measured by first measuring means 37 while first slider 35 is moved along first guide shaft 29, and the shape of one surface 17a of thin element 17 is measured as shown in FIG. 6(*b*).

The distance from standard point P2 of second measuring means 41 to the other surface 17b of thin element 17 is also continuously measured by second measuring means 41 while second slider 39 is moved along second guide shaft 31, and the shape of the other surface 17b of thin element 17 is measured as shown in FIG. 6(*c*).

In this embodiment, the thickness of thin element 17 is also determined as shown in FIG. 6(*d*) based on the measured data shown in FIG. 6(*b*) and (*c*).

Specifically, distance L between standard point P1 of first measuring means 37 and standard point P2 of second measuring means 41 is previously measured accurately by using, for example, block gage 73 as described above. Therefore, the thickness of thin element 17 is easily determined by subtracting the distance from standard point P1 of first measuring means 37 to one surface 17a of thin element 17 and the distance from standard point P2 of second measuring means 41 to the other surface 17b of thin element 17 from distance L.

It is seen in FIG. 7(*a*) that local projection 17d having the length of a few millimeters to a few tens of millimeters is formed on the other surface 17b of the silicon wafer constituting thin element 17.

In the same manner as in FIG. 6, the shape of one surface 17a of thin element 17 is measured as shown in FIG. 7(*b*), and the shape of the other surface 17b of thin element 17 is measured as shown in FIG. 7(*c*).

The thickness of the thin element 17 is determined as shown in FIG. 7(*d*) based on the measured data shown in FIG. 7(*b*) and (*c*).

It is seen in FIG. 8(*a*) that the silicon wafer constituting thin element 17 has uniform thickness and waviness having a short cycle.

In the same way as in FIG. 6, the shape of one surface 17a of thin element 17 is measured as shown in FIG. 8(*b*), and the shape of the other surface 17b of thin element 17 is measured as shown in FIG. 8(*c*).

The thickness of thin element 17 is determined as shown in FIG. 8(*d*) based on the measured data shown in FIG. 8(*b*) and (*c*).

Figure 9:
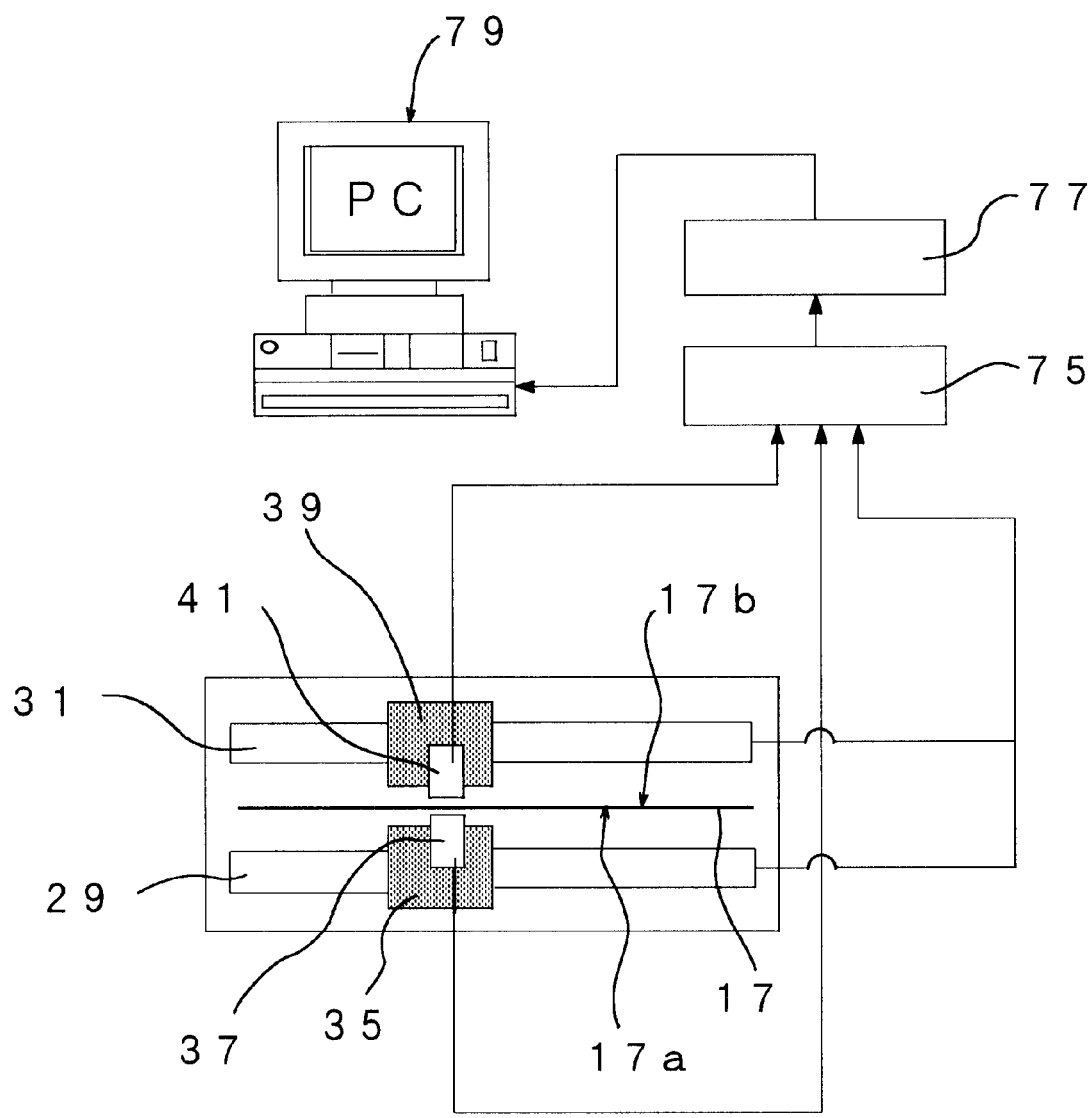
FIG. 9 is a block diagram of the apparatus for measuring the surface shape of a thin element shown in FIG. 1.

FIG. 9 is a block diagram showing the apparatus for measuring the surface shape of the thin element.

The distance from standard point P1 of first measuring means 37 to one surface 17a of thin element 17 and the distance from standard point P2 of second measuring means 41 to another surface 17b of thin element 17, as measured by first measuring means 37 and second measuring means 41, are entered in personal computer 79 through a driver 75 and a controller 77.

At the same time, the positions of first measuring means 37 and second measuring means 41, in other words, their positions in the horizontal direction with the measurement starting point at the center, are entered in personal computer 79.

Based on the input data, personal computer 79 then shows on the screen data of the surface shape and the thickness of thin element 17.

Figure 10:
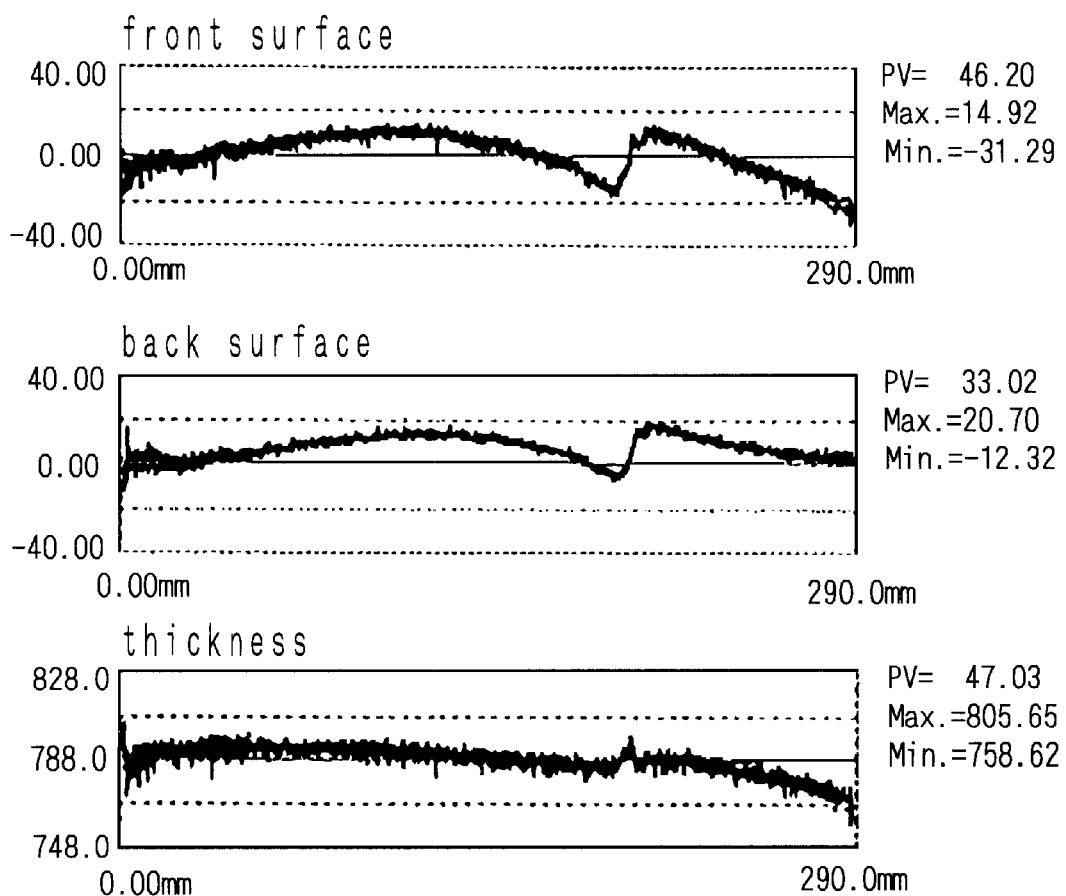
FIG. 10 is an explanatory diagram showing an example of the measuring of a thin element by the apparatus for measuring the surface shape of a thin element shown in FIG. 1.

FIG. 10 shows an example of the silicon wafer measurements, the silicon wafer having a diameter of 300 mm measured after slicing, being shown on the screen of personal computer 79.

It is seen that the front and back surfaces have step portions, but the thickness deflection does not indicate the step portions conspicuously.

Thus, the present invention can be applied for judging the accuracy of the measurement made by a machine in slicing silicon wafers.

Figure 11:
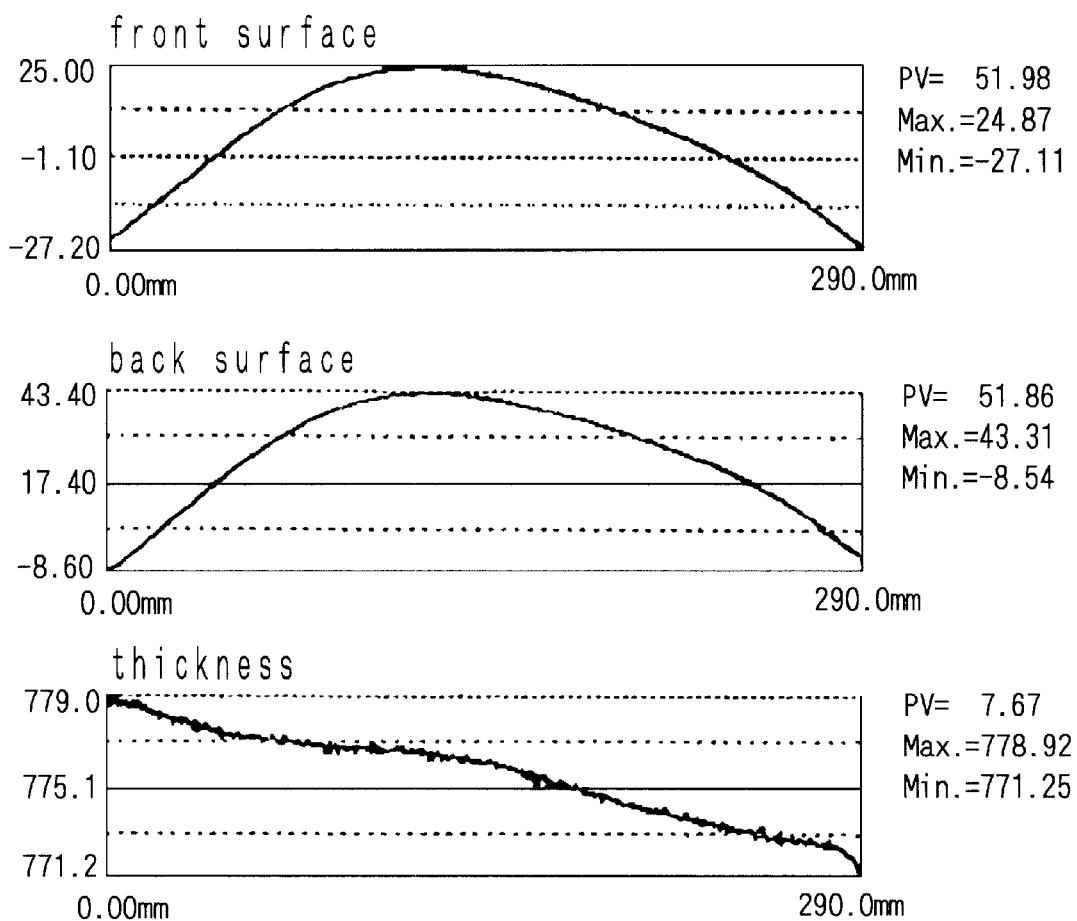
FIG. 11 is an explanatory diagram showing an example of the measuring of a thin element by the apparatus for measuring the surface shape of a thin element shown in FIG. 1.
Figure 13:
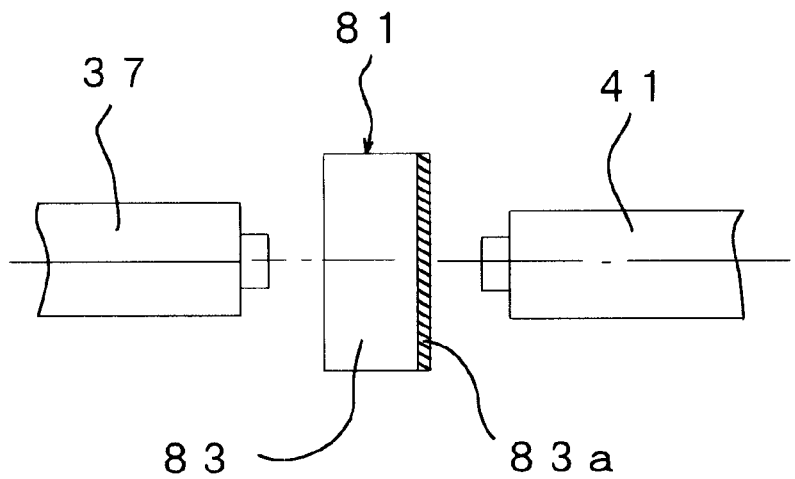
FIG. 13 is an explanatory diagram showing a method for using the aligning member shown in FIG. 10.

FIG. 11 shows an example of the measurements of the silicon wafer of FIG. 10 being polished and then measured, which is being indicated on the screen of personal computer 79. It is seen that the section shape is largely curved but the thickness deflection is about 7 μm.

The new method for measuring the surface shape of a thin element can measure the surface shape of thin element 17 with high accuracy because thin element 17 is supported so to be rotatable and movable within the same vertical plane, and because first and second guide shafts 29, 31 are arranged horizontally on either side of the vertical plane, and the distance to one surface 17a and the other surface 17b of thin element 17 is independently measured by first and second measuring means 37, 41 which are independently movable along first and second guide shafts 29, 31 to measure the surface shape of one surface 17a and the other surface 17b of thin element 17.

And, an overestimate or an underestimate can be prevented in evaluating the surface shape of a silicon wafer or the like because the surface shapes of one surface 17a and the other surface 17b of thin element 17 are independently measured.

The inventive apparatus for measuring the surface shape of a thin element can measure the surface shape of thin element 17 with high accuracy because it is simply configured in comprising support means 19 which supports rotatably and movably thin element 17 in the same vertical plane, first and second guide shafts 29, 31 which are horizontally disposed on either side of the vertical plane so to be parallel to the vertical plane and to each other, first and second sliders 35, 39 which are independently movable along first and second guide shafts 29, 31, and first and second measuring means 37, 41 which are fixed to first and second sliders 35, 39 to independently measure the distances to one surface 17a and the other surface 17b of thin element 17.

Since first measuring means 37 and second measuring means 41 are independently configured, it is not necessary to dispose first measuring means 37 and second measuring means 41 on the forked holding part as according to the known art, and thus the invention solves problems such as the enlargement of movement accuracy due to the forked design of the holding part and the occurrence of an Abbe error.

Specifically, the inventive apparatus does not suffer from the enlargement of an error due to motion accuracy, and can eliminate Abbe error by managing coordinates for taking in data with respect to first guide shaft 29 and second guide shaft 31 because first measuring means 37 and second measuring means 41 are fixed to first slider 35 and second slider 39 which move along first guide shaft 29 and second guide shaft 31 respectively.

Moreover, the inventive apparatus for measuring the surface shape of a thin element can readily and securely set the measurement starting points of first and second measuring means 37, 41 because block member 55 as the aligning means for positioning first and second measuring means 41 is set on the same axial line which is perpendicular to the vertical plane including the thin element 17.

The inventive method for measuring the thickness of a thin element can measure the thickness of thin element 17 with high accuracy if necessary because thickness at each part of the thin element 17 is measured based on the surface shapes of one surface 17a and the other surface 17b and the distance between first and second measuring means 37, 41.

The new apparatus can exclude deformations including warps due to the own weight of thin element 17 because thin element 17 is supported rotatably and movably within the same vertical plane.

Figure 12:
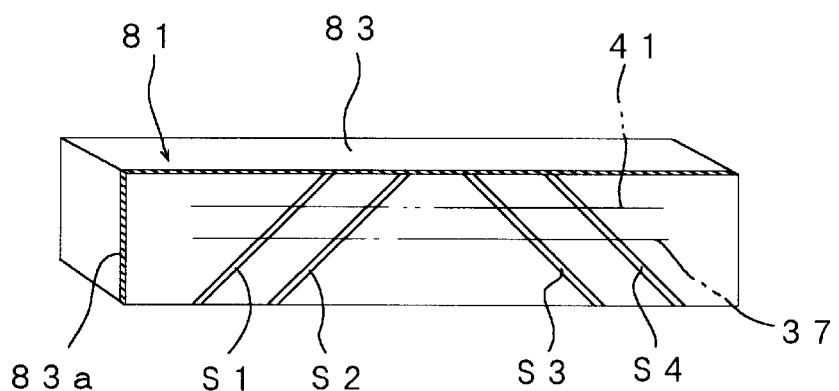
FIG. 12 is an explanatory diagram showing another example of an aligning member.

FIG. 12 shows another example of an aligning member used for aligning means. This aligning member 81 has reflection film 83a formed on one surface of transparent glass 83, two rightwardly slanted parallel slits S1, S2 formed on reflection film 83a at an angle of, for example, 45 degrees to the right and other two parallel slits S3, S4 similarly formed on the same reflection film so to slant in the opposite direction.

Reflection film 83a is formed by, for example, the deposition of aluminum.

Figure 14:
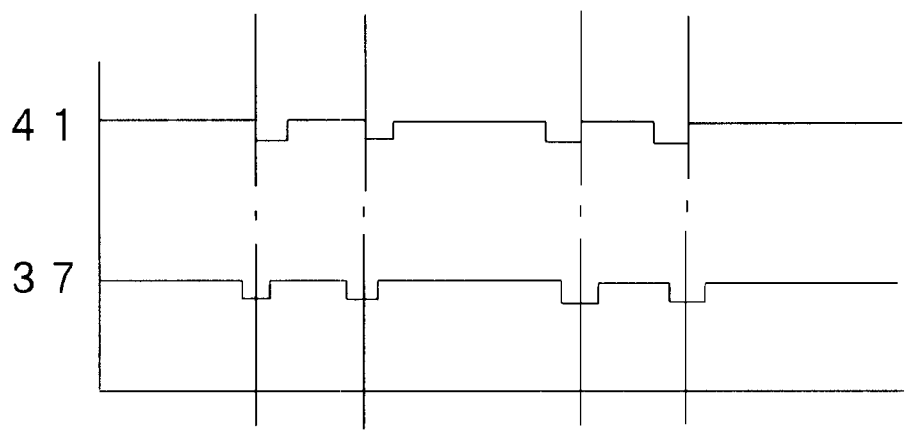
FIG. 14 is an explanatory diagram showing an output signal in using the aligning member shown in FIG. 10.
Figure 15:
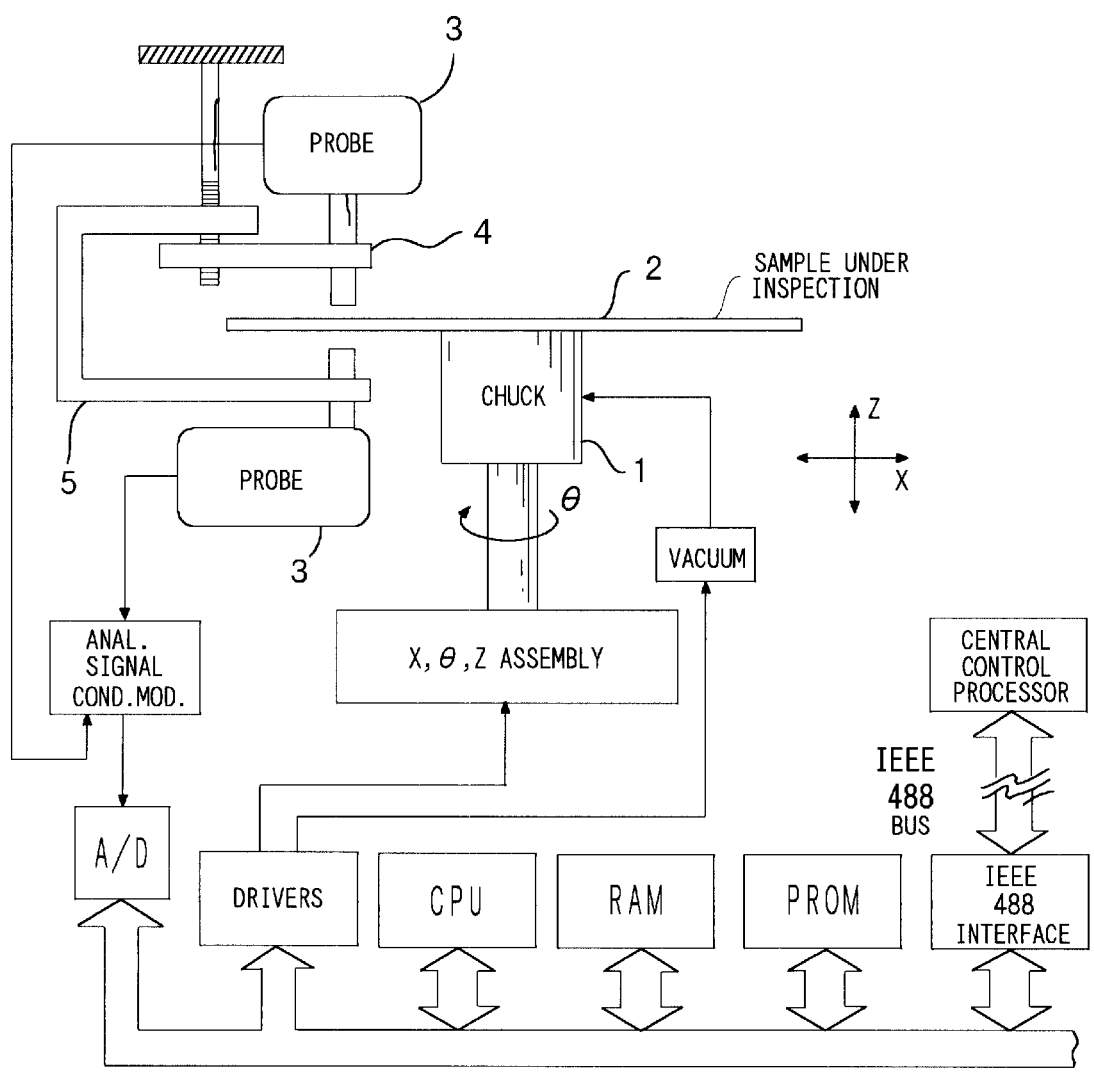
FIG. 15 is an explanatory diagram showing a conventional apparatus for measuring the surface shape of a thin element.
Figure 16:
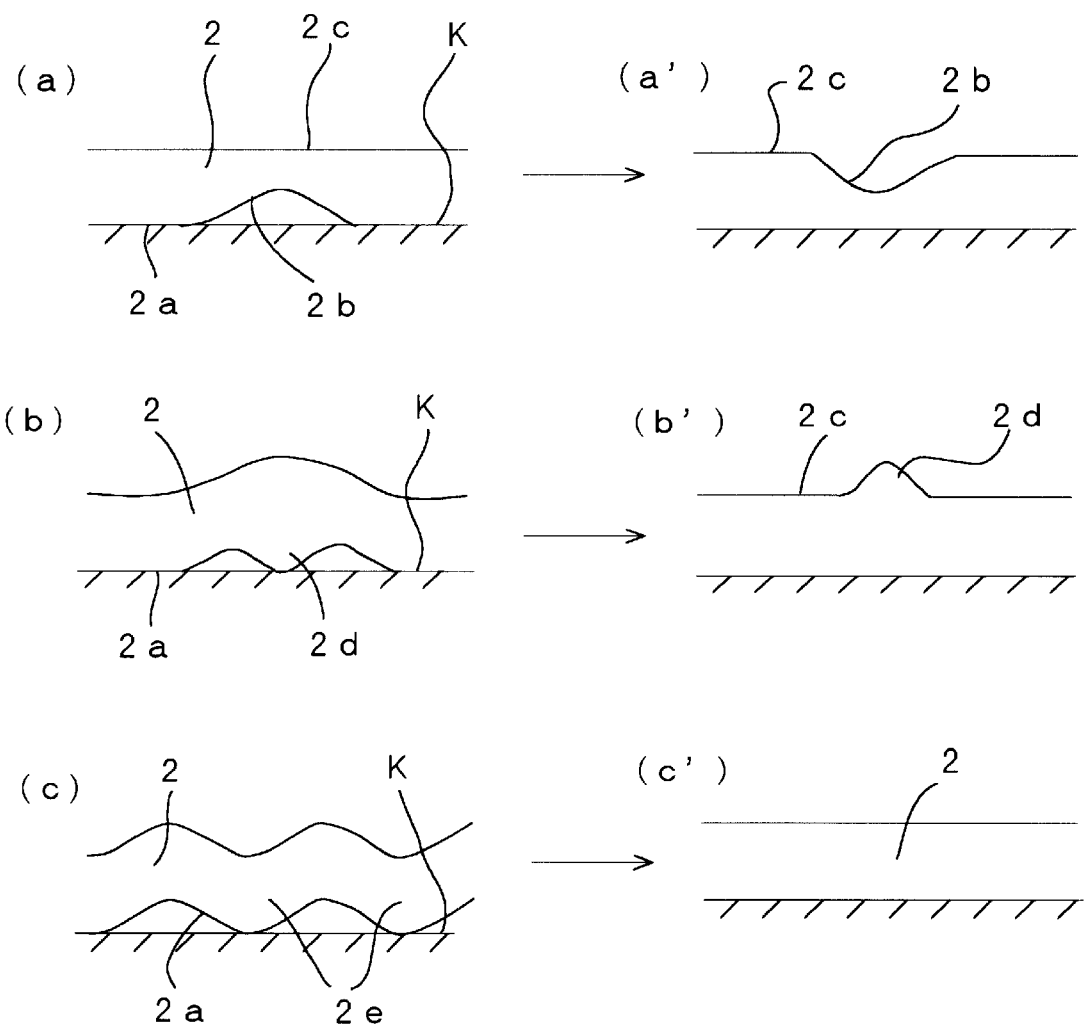
FIG. 16 is an explanatory diagram showing an example of the measuring done by the conventional apparatus for measuring the surface shape of a thin element.
Figure 17:
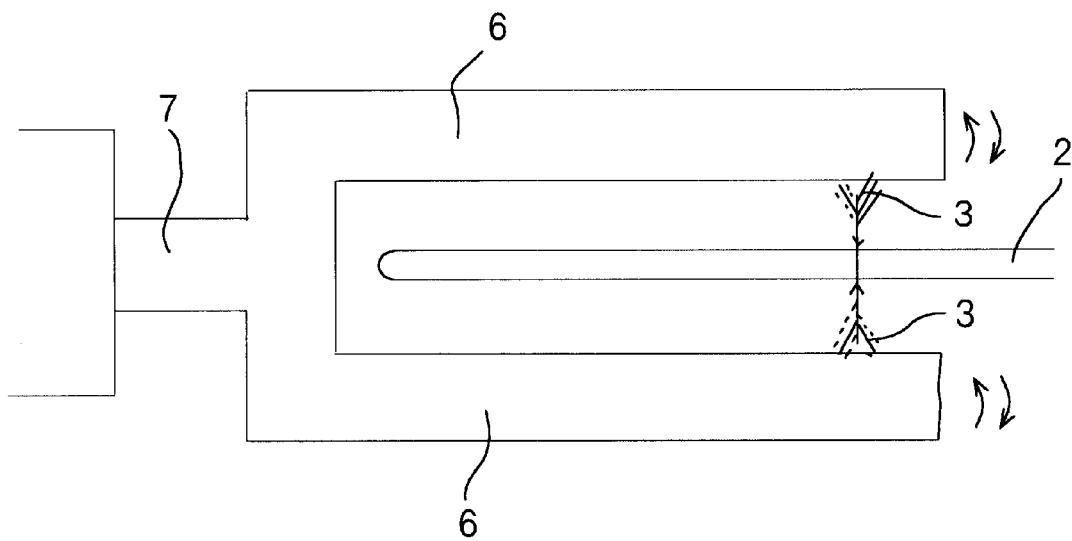
FIG. 17 is an explanatory diagram showing a forked holding member of the conventional apparatus for measuring the surface shape of a thin element.

When first measuring means 37 and second measuring means 41 are moved in the same direction from both sides of aligning member 81 as shown in FIG. 12, detection signals of respective slits S1, S2, S3, S4 are entered on the screen of personal computer 79 as shown in FIG. 14, for example.

Displacement in horizontal and vertical directions can be measured simultaneously owing to a relative difference of the detection signals from first measuring means 37 and second measuring means 41.

In the state shown in FIG. 14, it is seen that second measuring means 41 is displaced upward with respect to first measuring means 37 as shown in FIG. 12.

Although the embodiment was described with reference to measurement of thin element 17 as being a silicon wafer, it is to be understood that the invention is not limited to the described embodiment but can be extensively applied to the measurement of thin element 17 being the surface shape of, for example, glass for liquid crystals, a masking member or the like.

The embodiment was described with reference to the case in which thin element 17 was supported within the vertical plane. But, it is to be understood that the invention is not limited to the described embodiment but can also be applied to a case that thin element 17 is supported within a horizontal plane, and first measuring means 37 and second measuring means 41 are disposed above and below thin element 17.

In the above case, it is necessary to determine the warp owing to the own weight of thin element 17 in order to make corrections, but thin element 17 can be supported securely by the weight of thin element 17 by positioning thin element 17 within a horizontal plane.

Moreover, in the embodiment, the non-contact laser displacement meter was used for first measuring means 37 and second measuring means 41, but it is to be understood that the invention is not limited to the described embodiment and can also use other displacement meters such as an electrostatic capacitance displacement meter.

What is claimed is:

1. Method for measuring the surface shape of a thin board having opposite first and second surfaces, comprising:

supporting the thin board so that the thin board rotates within a single plane, disposing first and second guide shafts on one side and the other side of the plane so as to be parallel to the plane and to each other, measuring the distance each from a first standard point in the first measuring means to the first surface, and from a second standard point in the second measuring means to the second surface, by the first and second measuring means, respectively, which are independently movable along the first and second guide shafts, and measuring the surface shapes of the first surface and the second surface.

2. Method for measuring the surface shape of a thin board having opposite first and second surfaces according to claim 1, wherein the thin board is a silicon wafer, glass for liquid crystals, or a masking member.

3. Method for measuring the surface shape of a thin board having opposite first and second surfaces, comprising:

supporting the thin board so as to be movable within a single plane, disposing first and second guide shafts on one side and the other side of the plane so as to be parallel to the plane and to each other, measuring the distance each from a first standard point in the first measuring means to the first surface, and from a second standard point in the second measuring means to the second surface, by the first and second measuring means, respectively, which are independently movable along the first and second guide shafts, and measuring the surface shapes of the first surface and the second surface.

4. Apparatus for measuring the surface shape of a thin board having opposite first and second surfaces, comprising:

supporting means which supports the thin board so as to rotate within a single standard plane, first and second guide shafts which are disposed on one side and the other side of the plane so as to be parallel to the plane and to each other, first and second sliders which move independently along the first and second guide shafts, and first and second measuring means which are fixed to the first and second sliders respectively, the first measuring means being operable to independently measure the distance from a first standard point in the first measuring means to the first surface, and the second measuring means being operable to independently measure the distance from a second standard point in the second measuring means to the second surface.

5. Apparatus for measuring the surface shape of a thin board having opposite first and second surfaces according to claim 4, further comprising aligning means for positioning the first and second measuring means on a same axial line which is perpendicular to the plane.

6. Apparatus for measuring the surface shapes of a thin board having opposite first and second surfaces according to claim 4, wherein the first and second measuring means are displacement meters.

7. Apparatus for measuring the surface shape of a thin board having opposite first and second surfaces, comprising:

supporting means which supports the thin board so as to be movable within a single plane, first and second guide shafts which are disposed on one side and an opposite, other side of the plane so as to be parallel to the plane and to each other, first and second sliders which move independently along the first and second guide shafts, and first and second measuring means which are fixed to the first and second sliders and which separately measure the distance from a first standard point in the first measuring means to the first surface, and the distance from a second standard point in the second measuring means to the second surface.

8. Apparatus for measuring the surface shape of a thin board having opposite first and second surfaces according to claim 7, further comprising aligning means for positioning the first and second measuring means on a same axial line which is perpendicular to the plane.

9. Method for measuring the thickness of a thin board having opposite first and second surfaces, comprising:

supporting the thin board so as to be rotatable within a single plane, disposing first and second guide shafts on one side and an opposite, other side of the plane so as to be parallel to the plane and to each other, measuring the distance from a first standard point in the first measuring means to said first surface, and the distance from a second standard point in the second measuring means to the second surface by first and second measuring means which are independently movable along the first and second guide shafts, and measuring the thickness of the thin board based on the surface shapes of the first surface and the second surface obtained by measuring the surface shapes of the first surface and the second surface and the distance between the first and second measuring means.

10. Method for measuring the thickness of a thin board having opposite first and second surfaces, comprising:

supporting the thin board so as to be movable within a single plane, disposing the first and second guide shafts on one side and the other side of the plane so as to be parallel to the plane and to each other, measuring the distance from a first standard point in the first measuring means to said first surface, and the distance from a second standard point in the second measuring means to the second surface by first and second measuring means which are independently movable along the first and second guide shafts, and measuring the thickness of the thin board based on the surface shapes of the first surface and the second surface obtained by measuring the surface shapes of the first surface and the second surface and the distance between the first and second measuring means.

* * * * *

UNITED STATES PATENT AND TRADEMARK OFFICE
CERTIFICATE OF CORRECTION

PATENT NO. : 6,367,159 B1  Page 1 of 1
DATED : April 9, 2002
INVENTOR(S) : Naoi et al.

It is certified that error appears in the above-identified patent and that said Letters Patent is hereby corrected as shown below:

Column 5,
Line 39, delete "▒10," and replace with -- ▒/10, --.

Signed and Sealed this

First Day of October, 2002

Attest:

JAMES E. ROGAN
Attesting Officer  Director of the United States Patent and Trademark Office